United States Patent [19]

Adamczyk, Jr. et al.

[11] Patent Number: 5,375,414
[45] Date of Patent: Dec. 27, 1994

[54] AUTOMOTIVE ENGINE EXHAUST AFTERTREATMENT SYSTEM INCLUDING HYDROCARBON ADSORBER WITH INTERNAL ENGINE PURGE FLOW CONTROL

[75] Inventors: Andrew A. Adamczyk, Jr., Dearborn, Mich.; Ronald G. Hurley, Shenfield, Great Britain; James D. Pakko; Lisa A. Hansen, both of Dearborn, Mich.; Peter M. Lyon, Birmingham, Mich.

[73] Assignee: Ford Motor Company, Dearborn, Mich.

[21] Appl. No.: 131,188

[22] Filed: Oct. 4, 1993

[51] Int. Cl.$^5$ .............................. F01N 3/22
[52] U.S. Cl. ...................... 60/274; 60/279; 60/284; 60/289; 60/311
[58] Field of Search ............ 60/278, 279, 284, 285, 60/274, 311, 276, 289, 297

[56] References Cited

U.S. PATENT DOCUMENTS

| | | |
|---|---|---|
| 3,645,098 | 2/1972 | Templin et al. |
| 3,699,683 | 10/1972 | Tourtellotte et al. |
| 3,757,521 | 9/1973 | Tourtellotte et al. |
| 3,903,694 | 9/1975 | Aine. |
| 4,316,360 | 2/1982 | Liu et al. |
| 4,321,792 | 3/1982 | Achard. |
| 4,485,621 | 12/1984 | Wong et al. |
| 4,587,807 | 5/1986 | Suzuki. |
| 4,976,929 | 12/1990 | Cornelison et al. |
| 5,051,244 | 9/1991 | Dunne et al. |
| 5,090,200 | 2/1992 | Arai. |
| 5,125,231 | 6/1992 | Patil et al. |
| 5,136,842 | 8/1992 | Achleitner et al. |
| 5,152,137 | 10/1992 | Nishizawa. |
| 5,157,919 | 10/1992 | Gopp. |
| 5,205,120 | 4/1993 | Oblander et al. ............ 60/284 |

FOREIGN PATENT DOCUMENTS

| | | |
|---|---|---|
| 52-27914 | 3/1977 | Japan. |
| 58-210311 | 12/1983 | Japan. |
| 3-222808 | 6/1984 | Japan. |

*Primary Examiner*—Ira S. Lazarus
*Assistant Examiner*—Daniel J. O'Connor
*Attorney, Agent, or Firm*—Jerome R. Drouillard; Roger R. May

[57] ABSTRACT

An automotive internal combustion engine is equipped with a hydrocarbon adsorber for the purpose of controlling the emission of unburned hydrocarbons from the vehicle's tailpipe. Regeneration of the adsorber is achieved by an electronic engine controller operating a purge air system for drawing desorbed hydrocarbon material into the engine's intake.

9 Claims, 1 Drawing Sheet

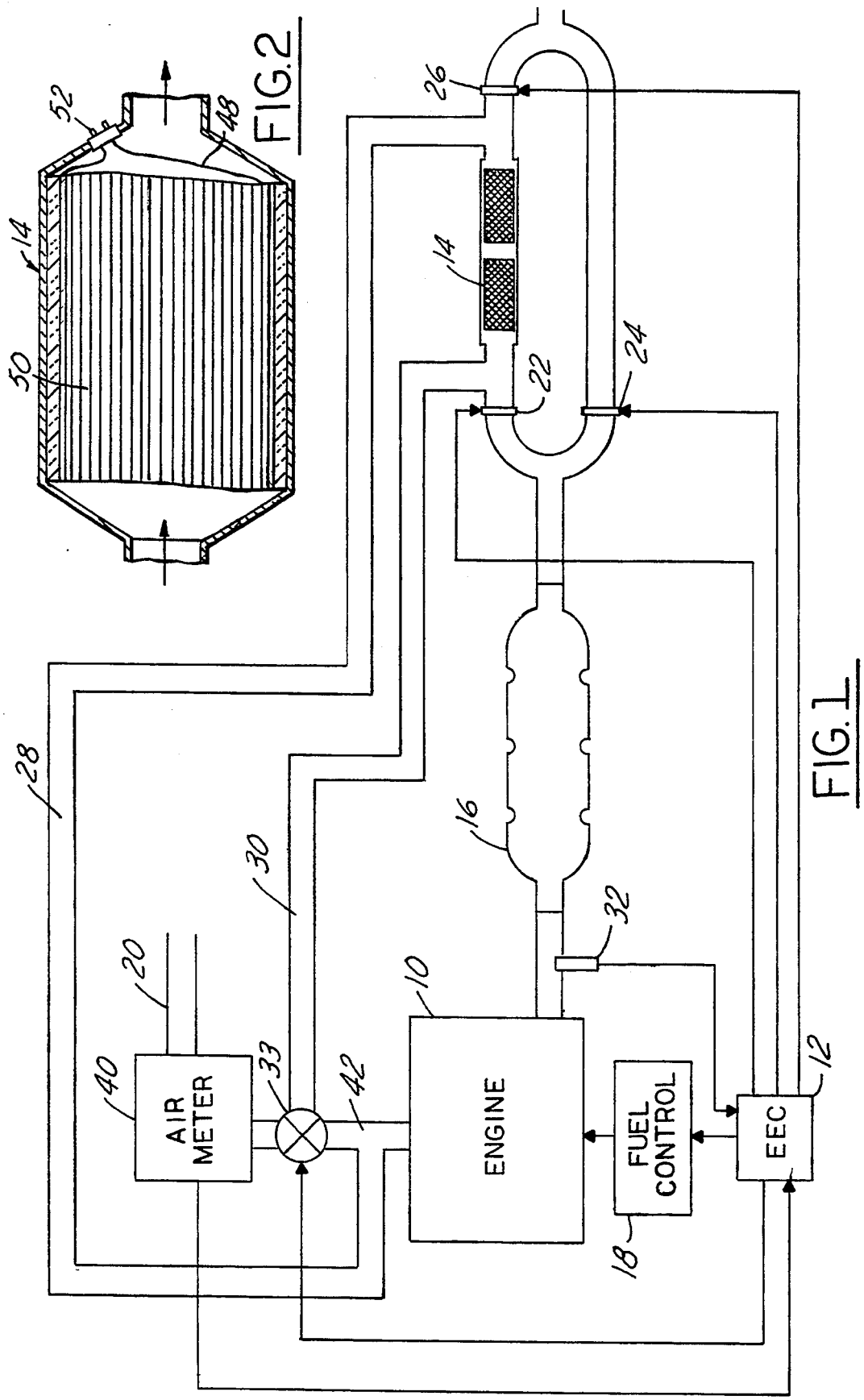

AUTOMOTIVE ENGINE EXHAUST AFTERTREATMENT SYSTEM INCLUDING HYDROCARBON ADSORBER WITH INTERNAL ENGINE PURGE FLOW CONTROL

BACKGROUND OF THE INVENTION

The present invention relates to an automotive engine having an exhaust gas aftertreatment system designed not only to dispose of exhaust gas hydrocarbons catalytically, but also to store such hydrocarbons during certain operating modes of the engine so that the hydrocarbons may be processed at some time following their storage.

DESCRIPTION OF THE PRIOR ART

One of the regulated exhaust emission constituents from automotive vehicles is unburned hydrocarbon ("HC"). This exhaust gas constituent is formed due to a number of operating conditions within the engine. In order to limit the tailpipe emissions of HC, it is currently necessary to equip vehicles with catalytic exhaust gas treatment devices located downstream from the engine. Such devices include the conventional oxidation catalyst ("COC") and the three-way catalyst ("TWC"). The conventional oxidation catalyst, as its name implies, serves to further oxidize unburned HC and carbon monoxide to carbon dioxide and water. The TWC, however, serves to not only oxidize HC and carbon monoxide, but also serves to reduce oxides of nitrogen.

Catalytic exhaust aftertreatment devices must reach a nominal operating temperature before the conversion rate of the material passing through the catalyst reaches a functional level. As a result, it is not possible to obtain much conversion immediately after a cold engine is started. Cold engine operation accordingly accounts for a good percentage of the exhaust gas hydrocarbons emitted by regulated vehicles. In response to the recognition of the inefficiency of cold catalytic after-treatment devices, it has been proposed, for example, in U.S. Pat. No. 5,051,244 (Dunne et al.) to use a hydrocarbon adsorber positioned upstream of a catalyst, for the purpose of removing hydrocarbons from the exhaust at times when the catalyst has not obtained a sufficient operating temperature. The hydrocarbon adsorber serves to store the exhaust hydrocarbon until such time as the catalytic device has heated sufficiently to handle the hydrocarbon material when it is desorbed. Unfortunately, the device of the '244 patent suffers from the deficiency that the flow of desorbed material may very well upset the required balance of oxidizer and hydrocarbon material necessary to achieve complete catalysis in the catalytic after-treatment device. It is an object and an advantage of the present invention that regeneration of a hydrocarbon adsorber may be achieved without upsetting the chemical balance acquired for catalysis to occur at high efficiency within a downstream catalyst.

SUMMARY OF THE INVENTION

An automotive engine and exhaust emission control system comprises an internal combustion engine, an exhaust hydrocarbon adsorber for selectively receiving exhaust from the engine, and a catalytic exhaust gas treatment device for treating effluent from the engine. An exhaust gas oxygen sensor located between the engine and the catalytic device senses the concentration of oxygen in the exhaust stream entering the catalytic device. The present invention also includes a purge system for controllably conducting air from the intake of the engine and for passing the purge air through the adsorber and then reintroducing the air, as well as desorbed hydrocarbon material, into the engine intake. Control of the purge flow is accomplished by a diverter valve which is operated by an engine control computer. The computer, which receives exhaust oxygen data from an oxygen sensor, controls the purge air flow such that the concentration of oxygen in the exhaust flowing into the catalytic device will be suitable for oxidizing and/or reducing the unwanted exhaust constituents flowing into the catalytic device.

The catalytic device may comprise either a conventional oxidizing catalyst or a three-way catalyst. In the event that a conventional oxidizing catalyst is used, the engine control computer will control the purge flow, and in one embodiment, the main fuel flow provided by a fuel control operated by the computer, such that the amount of air supplied to the adsorber will provide sufficient oxygen to oxidize the hydrocarbon material in the engine's exhaust stream at an oxygen supply rate of 0.95 to 1.10 times the amount of air corresponding to the stoichiometric air/fuel ratio. In the case of a three-way catalyst, the engine control computer will control the air pump such that the amount of air supplied to the adsorber will contain an amount of oxygen corresponding to the stoichiometric air/fuel ratio.

A system according to the present invention may incorporate a hydrocarbon adsorber including a flow box having a metallic substrate located within the flow box, with the substrate having an adsorptive washcoat applied thereto. A source of electric current, connected with said substrate and controlled by the engine control computer, may be used for heating the substrate to assist in desorption of the hydrocarbon material.

BRIEF DESCRIPTION OF THE DRAWINGS

FIG. 1 is a schematic representation of a system according to the present invention.

FIG. 2 is a schematic representation of an electrically heated hydrocarbon adsorber according to the present invention.

DETAILED DESCRIPTION OF THE PREFERRED EMBODIMENTS

As shown in FIG. 1, automotive engine 10 has an exhaust emission control system including exhaust hydrocarbon adsorber 14 for receiving exhaust from the engine, and catalytic exhaust gas treatment device 16. Exhaust treatment device 16 may comprise either a conventional oxidizing catalyst or a three-way catalyst of the types known to those skilled in the art and suggested by this disclosure. Air enters the engine via air meter 40 and intake manifold 42.

Untreated exhaust gas flowing from the engine first encounters exhaust gas oxygen sensor 32 which, acting in concert with electronic engine control computer 12 ("EEC") measures the oxygen content of the exhaust. Thereafter the exhaust flows through catalytic device 16 and then through either adsorber 14, or through bypass 34. Fuel control 18, which is operated by engine control computer 12, controls the air/fuel ratio at which engine 10 is operated such than the necessary oxidant and reductant are contained within the exhaust flowing from the engine to achieve the optimal level of exhaust aftertreatment in catalyst 16.

As noted above, when engine 10 is first started, catalyst 16 will frequently not be at or above the threshold temperature required for the catalytic reactions to occur. In this case, during cold catalyst operation bypass valve 24 will be maintained in the closed position by computer 12. Accordingly, all of the exhaust gas leaving engine 10 will be directed through hydrocarbon adsorber 14. Diverter valve 33 will also be closed to prevent any flow into the intake system of engine 10.

Hydrocarbon adsorber 14 may be constructed of a carbon monolith, or pelleted carbon, or zeolite having a suitable washcoat, or other materials known to those skilled in the art and suggested by this disclosure. Although adsorber 14 is shown as having two adsorbing elements, those skilled in the art will further appreciate that a single element or a variety of elements could be used, having not only a single flow path, but alternatively, multiple flow paths according to the present invention. In any event, gases emanating from engine 10 during cold operation will pass through adsorber 14 allowing unburned hydrocarbon to be removed from the exhaust gas stream.

When engine 10 is started cold, all of the exhaust will be routed through adsorber 14. Once catalyst 16 has reached operating temperature, bypass valve 24 will be moved by engine control computer 12 to its open position, thereby allowing exhaust gas to pass solely through bypass 34 and not through hydrocarbon adsorber 14. In this manner hydrocarbon adsorber 14 will be protected from excessively high operating temperature.

The regeneration of adsorber 14 is managed by engine control computer 12 to achieve desorption of hydrocarbon material from adsorber 14 without upsetting the catalysis occurring within catalyst 16. To accomplish this, it is necessary that the exhaust stream flowing to catalyst 16 have a controlled amount of oxidant sufficient to promote catalysis within catalyst 16.

As noted above, when catalyst 16 has reached its operating temperature, computer 12 will open valve 24 and close valves 22 and 26. Exhaust gas will then be allowed to flow through bypass 34. The closure of valves 22 and 26 will isolate hydrocarbon adsorber 14 from the remainder of the exhaust aftertreatment system and allow regeneration of adsorber 14 to be conducted without upsetting the air/fuel ratio control of the engine. Sensor 32 senses the concentration of oxygen in the exhaust stream entering catalyst 16. Engine control computer 12 receives information from sensor 32 regarding this concentration and controls diverter valve 33 and fuel control 18 to maintain the stoichiometry required for an acceptable level of catalysis within catalytic converter 16.

During the desorption process which regenerates adsorber 14, computer 12 opens diverter valve 33 to allow a controlled flow of air from engine intake manifold 42 through supply line 30 and into adsorber 14. Upon passing through adsorber 14, the flowing air causes desorption of the adsorbed hydrocarbon material. The air and desorbed hydrocarbons then pass along discharge line 28 and back into engine intake manifold 42. It is thus seen that engine 10 receives fuel not only via fuel control 18 but also from adsorber 14.

Computer 12 must use sensor 32 to determine the amount of oxygen contained in the engine exhaust. Then, the amount of fuel delivered by the air passing through adsorber 14 may be adjusted by further opening or closing diverter valve 33. If required, fuel control 18 may be used to compensate for the fuel being delivered to engine 10 in the form of desorbed hydrocarbons from adsorber 14. In any event, computer 12 will assure that proper levels of oxidant and reductant are provided for the type of catalyst 16 which is employed. For example, computer 12 will control diverter valve 33 and fuel control 18 such that the exhaust exiting engine 10 will contain an amount of oxygen equal to 0.95 to 1.10 times the amount of oxygen corresponding to the stoichiometric requirement in the event that a conventional oxidizing catalyst 16 is used. In the event that the three-way catalyst is used as element 16, engine control computer 12 will control the total fuel supplied to engine 10 such that the oxidant contained in the exhaust stream flowing into catalyst 16 is approximately at a stoichiometric air/fuel ratio. If oxygen sensor 22 indicates that the exhaust flowing from engine 10 contains too little oxygen, computer 12 may either reduce the fuel supplied by fuel control 18, or reduce the fuel supplied through discharge line 28. It may be desirable to reduce the fuel from fuel control 18, not only to conserve fuel, but also to speed the regeneration of adsorber 14.

In the event that more rapid regeneration of hydrocarbon adsorber 14 is required, the adsorber may be configured as a flow box or can having a metallic substrate located within, with the substrate having an adsorptive washcoat applied thereto (FIG. 2). Substrate 50 may comprise a corrugated stainless steel monolith which is electrically insulated from outer box 48. A source of electric current (not shown), controlled by engine control computer 12, is connected with substrate 50 at terminal block 52. When current passes through substrate 50, the temperature of the substrate increases and this causes the desorption process to occur at a higher rate. As another alternative, substrate 50 may comprise a non-metallic structure having an electrically conductive adsorbing washcoat applied thereto.

Those skilled in the art will understand that variations and modifications may be made to the present invention without departing from the spirit and scope of the invention as defined in the appended claims.

We claim:

1. An automotive engine and exhaust emission control system, comprising:

an internal combustion engine;

an exhaust hydrocarbon adsorber for selectively receiving the exhaust from the engine;

a purge system means for controllably conducting air from the intake of the engine, for passing said air through the adsorber, and for reintroducing the air, containing desorbed hydrocarbon material, into the engine intake, with said purge system having a diverter valve for controlling the rate of airflow through the purge system;

a catalytic exhaust gas treatment means for treating effluent from the engine;

an exhaust gas oxygen sensor means, located between the engine and said catalytic device, for sensing the concentration of oxygen in the exhaust stream entering the catalytic device;

an engine control computer means connected with said oxygen sensor means and with said diverter valve, with said computer means operating said oxygen sensor means and said diverter valve so as to measure the oxygen content of the exhaust flowing past the oxygen sensor means, with said computer means controlling said diverter valve in response to the oxygen sensed when the valve is open to allow purge flow, such that the concentration of oxygen in the exhaust flowing into the catalytic means will be suitable for oxidizing the hydrocarbon material contained in the exhaust.

2. An automotive engine and exhaust emission control system according to claim 1, wherein said catalytic means comprises a conventional oxidizing catalyst, with said engine control computer means controlling said diverter valve such that the amount of air supplied to the adsorber so as to provide sufficient oxygen to oxidize the hydrocarbon material in the exhaust is 0.95 to 1.10 times the amount of air corresponding to the stoichiometric air/fuel ratio.

3. An automotive engine and exhaust emission control system according to claim 1, wherein said catalytic means comprises a three way catalyst.

4. An automotive engine and exhaust emission control system according to claim 3, with said engine control computer means controlling said diverter valve such that the amount of air supplied to the adsorber so as to provide sufficient oxygen to oxidize the hydrocarbon material in the catalyst corresponds to the stoichiometric air/fuel ratio.

5. An automotive engine and exhaust emission control system according to claim 1, further comprising switching means, controlled by said computer, for selectively routing exhaust flowing from the engine either through said adsorber, or through a bypass tube, with said switching means further comprising means for isolating said adsorber from said exhaust flow when the exhaust flow is switched to the bypass tube.

6. An automotive engine and exhaust emission control system, comprising:
   an internal combustion engine;
   an exhaust hydrocarbon adsorber for selectively receiving the exhaust from the engine;
   a purge system means for controllably conducting air from the intake of the engine, for passing said air through the adsorber, and for reintroducing the air, containing desorbed hydrocarbon material, into the engine intake, with said purge system having a diverter valve for controlling the rate of airflow through the purge system;
   a catalytic exhaust gas treatment means for treating effluent from the engine;
   an exhaust gas oxygen sensor means, located between the engine and said catalytic device, for sensing the concentration of oxygen in the exhaust stream entering the catalytic device;
   a fuel control means for supplying fuel to the engine;
   an engine control computer means connected with and operating said oxygen sensor, said diverter valve and said fuel control, with said computer means measuring the oxygen content of the exhaust flowing past the oxygen sensor means, and controlling said diverter valve and said fuel control means in response to the oxygen sensed when the valve is open to allow purge flow such that the concentration of oxidant and reductant in the exhaust flowing into the catalytic device will be suitable for processing the exhaust in the catalytic exhaust treatment device.

7. An automotive engine and exhaust emission control system according to claim 6, wherein said hydrocarbon adsorber comprises a flow box having a metallic substrate located within, with said substrate having an adsorptive washcoat applied thereto, and with said emissions control system further comprising a source of electric current, connected with said substrate and controlled by said engine control computer, for heating said substrate to assist in the desorption of hydrocarbon material therefrom.

8. An automotive engine and exhaust emission control system according to claim 6, wherein said hydrocarbon adsorber comprises a flow box having a nonmetallic substrate located within, with said substrate having an adsorptive, electrically conductive washcoat applied thereto, and with said emissions control system further comprising a source of electric current, connected with said substrate and controlled by said engine control computer, for heating said substrate to assist in the desorption of hydrocarbon material therefrom.

9. A method for using an oxygen sensor and fuel control to regulate the regeneration of an automotive internal combustion engine exhaust hydrocarbon adsorber employed in an exhaust treatment system incorporating at least one catalytic exhaust treatment device, comprising the steps of:
   routing the engine's exhaust through the adsorber when the engine is started and until the catalytic treatment device reaches operating temperature;
   conducting purge air from the intake of the engine through a diverter valve, passing said air through the adsorber, and reintroducing the air, containing desorbed hydrocarbon material, into the engine intake;
   sensing the oxygen contained in the exhaust flowing from the engine when said purge air is flowing through the adsorber and into the intake; and
   operating the fuel control and the diverter valve such that the amount of fuel supplied to the engine from the fuel control and the desorbed hydrocarbon material from the adsorber causes the exhaust flowing from the engine to contain an amount of oxidant and reductant necessary to operate the catalytic device.

* * * * *